US012645050B2

(12) United States Patent (10) Patent No.: US 12,645,050 B2
Zhou et al. (45) Date of Patent: Jun. 2, 2026

(54) DRIVING APPARATUS, IMAGE COLLECTION MODULE, AND METHOD FOR VOLTAGE REGULATION

(71) Applicant: Shanghai Awinic Microelectronics Technology Co., Ltd., Shanghai (CN)

(72) Inventors: Xuanchen Zhou, Shanghai (CN); Chao Yang, Shanghai (CN); Hao Wei, Shanghai (CN)

(73) Assignee: Shanghai Awinic Microelectronics Technology Co., Ltd. (CN)

( * ) Notice: Subject to any disclaimer, the term of this patent is extended or adjusted under 35 U.S.C. 154(b) by 0 days.

(21) Appl. No.: 19/056,925

(22) Filed: Feb. 19, 2025

(65) Prior Publication Data

US 2026/0104570 A1 Apr. 16, 2026

Related U.S. Application Data

(63) Continuation of application No. PCT/CN2025/070501, filed on Jan. 3, 2025.

(51) Int. Cl.
*G02B 7/10* (2021.01)
*G02B 7/04* (2021.01)

(52) U.S. Cl.
CPC ..................................... *G02B 7/04* (2013.01)

(58) Field of Classification Search
CPC ....................................................... G02B 7/102
See application file for complete search history.

(56) References Cited

U.S. PATENT DOCUMENTS

2017/0019596 A1 1/2017 Dunn et al.

FOREIGN PATENT DOCUMENTS

| CN | 112367463 | A | 2/2021 | |
| CN | 115755490 | * | 3/2023 | ............... G03B 5/00 |
| CN | 115755490 | A | 3/2023 | |

(Continued)

OTHER PUBLICATIONS

The first office action and search report of CN202410503100.X issued by CNIPA on May 30, 2024.

(Continued)

*Primary Examiner* — Joseph P Martinez
(74) *Attorney, Agent, or Firm* — Emerson, Thomson & Bennett, LLC; Roger D. Emerson; Peter R. Detorre

(57) ABSTRACT

A driving apparatus, an image collection module, and a method for voltage regulation are provided. The driving apparatus includes: a control module, a driving module, and a voltage regulation unit. The control module is configured to acquire displacement information of an image collection apparatus, transmit a driving current instruction to the driving module based on the displacement information, and transmit a voltage regulation signal to the voltage regulation unit based on the displacement information; the driving module is configured to generate a driving current based on the driving current instruction; and the voltage regulation unit is configured to regulate a voltage inputted from a power supply to a driving voltage matching the driving current based on the voltage regulation signal, and transmit the driving voltage to the driving module, so that the driving module drives a motor of image collection apparatus through the driving current and the driving voltage.

10 Claims, 4 Drawing Sheets

(56)     References Cited

FOREIGN PATENT DOCUMENTS

| CN | 117729411  A | 3/2024 |
|----|--------------|--------|
| CN | 118075602  A | 5/2024 |
| JP | 2005159189  A | 6/2005 |
| JP | 2011112701  A | 6/2011 |
| JP | 2014219532  A | 11/2014 |
| JP | 2015211357  A | 11/2015 |
| JP | 2016051044  A | 4/2016 |
| JP | 2020086194  A | 6/2020 |
| KR | 1020170097329  A | 8/2017 |
| KR | 1020180098142  A | 9/2018 |
| KR | 1020220071500  A | 5/2022 |
| KR | 1020230085180  A | 6/2023 |
| KR | 1020230140836  A | 10/2023 |

OTHER PUBLICATIONS

The second office action and search report of CN202410503100.X issued by CNIPA on Jun. 20, 2024.
The Notification to Grant A Patent Right of CN202410503100.X issued by CNIPA on Jul. 9, 2024.
International search report of PCT/CN2025/070501 issued by CNIPA on Mar. 31, 2025.

* cited by examiner

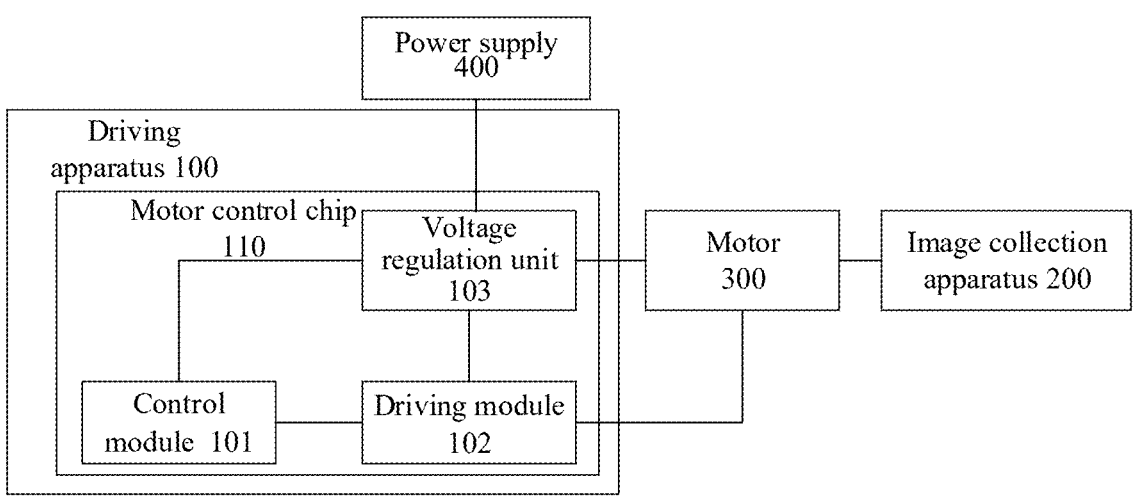
FIG. 6
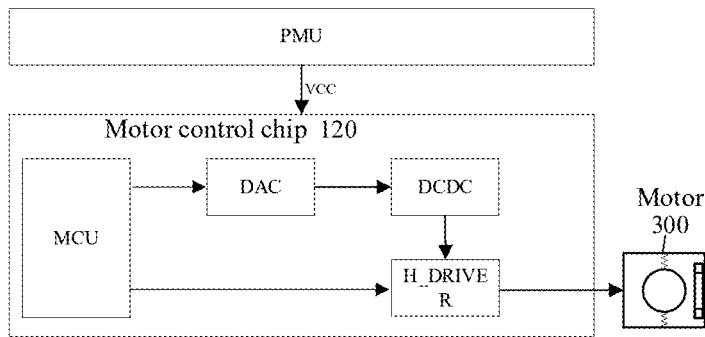
FIG. 7
FIG. 8

DRIVING APPARATUS, IMAGE COLLECTION MODULE, AND METHOD FOR VOLTAGE REGULATION

CROSS REFERENCE TO RELATED APPLICATIONS

The present application is a continuation of international application No PCT/CN2025/070501, filed on Jan. 3, 2025, which claims priority to Chinese Patent Application No. 202410503100.X titled "DRIVING APPARATUS, IMAGE COLLECTION MODULE, AND METHOD FOR VOLTAGE REGULATION" and filed with the China National Intellectual Property Administration on 24 Apr. 2024, both of which are incorporated herein by reference in their entireties.

TECHNICAL FIELD

The present disclosure relates to the technical field of optical lens driving, and particularly relates to a driving apparatus, an image collection module, and a method for voltage regulation.

BACKGROUND

At present, most camera modules of portable electronic devices, such as mobile phones and tablets, on the market use auto focus systems and optical image stabilization systems (also referred to as optical image stabilizers) to achieve image stabilization. After determining a displacement amount of focusing or dithering, an auto focus and optical image stabilization camera module drives a camera motor to generate a displacement, to achieve focusing or compensate for the dithering.

At present, the camera motor is driven either by changing a driving current of the motor without changing a driving voltage to achieve displacement of the camera, which is, however, power-consuming with a low energy efficiency ratio, or by pulse width modulation (PWM), to change the driving voltage and frequency in a coordinated manner to drive the motor. However, pulse width modulation will introduce large noises, thereby resulting in poor driving accuracy.

SUMMARY

In view of this, embodiments of the present disclosure provide a driving apparatus, an image collection module, and a method for voltage regulation, to at least partially solve the above problems.

According to an embodiment of the present disclosure in a first aspect, a driving apparatus is provided. The driving apparatus is configured to drive a motor of an image collection apparatus, wherein the driving apparatus comprises: a control module, a driving module, and a voltage regulation unit; the control module is configured to acquire displacement information of the image collection apparatus, transmit a driving current instruction to the driving module based on the displacement information, and transmit a voltage regulation signal to the voltage regulation unit based on the displacement information; the driving module is configured to generate a driving current based on the driving current instruction; and the voltage regulation unit is configured to regulate a voltage inputted from a power supply to a driving voltage matching the driving current based on the voltage regulation signal, and transmit the driving voltage to the driving module, so that the driving module drives the motor through the driving current and the driving voltage.

In a possible implementation, the control module is configured to generate a voltage regulation instruction based on the displacement information, wherein the voltage regulation instruction is used to generate the voltage regulation signal.

In a possible implementation, the driving apparatus further includes a digital to analog converter; the control module is configured to transmit the voltage regulation instruction to the digital to analog converter; and the digital to analog converter is configured to generate the voltage regulation signal based on the voltage regulation instruction, and transmit the voltage regulation signal to the voltage regulation unit, so that the voltage regulation unit regulates a voltage value of the voltage inputted from the power supply to a voltage value indicated by the voltage regulation signal.

In a possible implementation, the voltage regulation unit is configured to regulate a voltage value of the voltage inputted from the power supply to a voltage value indicated by the voltage regulation signal based on the voltage regulation signal.

In a possible implementation, the control module is configured to determine a first focusing code and a second focusing code based on the displacement information, and generate the voltage regulation instruction based on the first focusing code and the second focusing code, wherein a first driving current corresponding to the first focusing code is used to drive the motor to drive the image collection apparatus to move in a direction of an optical axis, and a second driving current corresponding to the second focusing code is used to drive the motor to drive the image collection apparatus to move in a direction perpendicular to the optical axis.

In a possible implementation, the power supply powers the control module through a power supply interface of the control module.

In a possible implementation, the voltage regulation unit supplying powers the control module through a power supply interface of the control module.

According to an embodiment of the present disclosure in a second aspect, an image collection module is provided, including a displacement information generation apparatus, as well as the driving apparatus, the motor, and the image collection apparatus according to any one embodiment in the first aspect; wherein the displacement information generation apparatus is configured to generate displacement information based on a displacement generated by the image collection apparatus, and transmit the displacement information to the driving apparatus; and the motor is driven by the driving apparatus to drive the image collection apparatus to generate the displacement.

In a possible implementation, the displacement information generation apparatus includes a host or a gyroscope sensor; the host is configured to generate the displacement information of the image collection apparatus based on a plurality of images collected by the image collection apparatus; and the gyroscope sensor is configured to convert motion information of the image collection apparatus into an angular amount, and generate the displacement information of the image collection apparatus based on the angular amount, wherein the motion information of the image collection apparatus at least includes an angular velocity of the image collection apparatus and an acceleration of the image collection apparatus.

According to an embodiment of the present disclosure in a third aspect, a method for voltage regulation is provided, including: acquiring displacement information of an image collection apparatus; generating a driving current instruction and a voltage regulation signal based on the displacement information; generating a driving current based on the driving current instruction; regulating a voltage inputted from a power supply based on the voltage regulation signal to obtain a driving voltage; and driving a motor based on the driving current and the driving voltage, wherein the driving voltage matches the driving current, and the motor is configured to drive the image collection apparatus.

In a possible implementation, the process of the generating the voltage regulation signal based on the displacement information may further include: generating a voltage regulation instruction based on the displacement information, and generating the voltage regulation signal based on the voltage regulation instruction.

In a possible implementation, the process of the generating the voltage regulation signal based on the voltage regulation instruction may further include: performing digital to analog conversion on the voltage regulation instruction to obtain the voltage regulation signal.

In a possible implementation, the process of the generating the voltage regulation signal based on the voltage regulation instruction may further include: determining the voltage regulation instruction as the voltage regulation signal.

In a possible implementation, the process of the generating the voltage regulation signal based on the displacement information may further include: determining a first driving current and a second driving current based on the displacement information; generating the voltage regulation instruction based on a maximum value of the first driving current and the second driving current, wherein the first driving current is used to drive the motor to drive the image collection apparatus to move in a direction of an optical axis, and the second driving current is used to drive the motor to drive the image collection apparatus to move in a direction perpendicular to the optical axis.

In a possible implementation, the process of the generating the voltage regulation signal based on the displacement information may further include: determining a first focusing code and a second focusing code based on the displacement information, and generating the voltage regulation instruction based on the first focusing code and the second focusing code, wherein a first driving current corresponding to the first focusing code is used to drive the motor to drive the image collection apparatus to move in a direction of an optical axis, and a second driving current corresponding to the second focusing code is used to drive the motor to drive the image collection apparatus to move in a direction perpendicular to the optical axis.

As can be seen from the above technical solutions, the control module generates the driving current instruction based on the displacement information of the image collection apparatus, and then generates a voltage regulation signal used to enable the voltage regulation unit to regulate the voltage inputted from the power supply to the driving voltage matching the driving current, so that the voltage regulation unit controls the voltage inputted from the power supply based on the actual power required by the driving module to drive the motor, thereby reducing the power consumption, and improving the energy efficiency ratio.

BRIEF DESCRIPTION OF DRAWINGS

To more clearly describe technical solutions in embodiments of the present disclosure or the prior art, drawings to be used in the description of the embodiments or the prior art will be briefly introduced below. Apparently, the drawings in the description below are merely some embodiments disclosed in the embodiments of the present disclosure. For those of ordinary skills in the art, other drawings may also be obtained based on these drawings.

FIG. 6 is a schematic diagram of another driving apparatus including a motor control chip provided in an embodiment of the present disclosure;

FIG. 7 is a schematic diagram of another driving apparatus applicable to embodiments of the present disclosure;

FIG. 8 is a schematic diagram of an image collection module provided in an embodiment of the present disclosure.

DETAILED DESCRIPTION

To enable those skilled in the art to better understand technical solutions of embodiments of the present disclosure, the technical solutions of the embodiments of the present disclosure will be clearly and completely described below with reference to the drawings in the embodiments of the present disclosure. Apparently, the described embodiments are merely some, instead of all, of the embodiments of the present disclosure. All other embodiments obtained by those of ordinary skills in the art based on some embodiments among the embodiments of the present disclosure should be encompassed within the scope of protection of the embodiments of the present disclosure.

The terms used in the present disclosure are intended merely to describe particular embodiments, and are not intended to limit the present disclosure. The singular forms of "a" and "the" used in the present disclosure and the appended claims are also intended to include plural forms, unless the context clearly indicates other meanings. It should be further understood that the term "and/or" used herein refers to and includes any or all possible combinations of one or more associated listed items.

It should be understood that various kinds of information may be described by using the terms, such as first, second, and third, in the present disclosure, but the information should not be limited to these terms. These terms are merely used to distinguish between information of a same type. For example, the first piece of information may also be called the second piece of information, and similarly, the second piece of information may also be called the first piece of information, without departing from the scope of the present disclosure. Depending on the context, as used herein, the word "if" may be interpreted as "at the time of . . . " or "when . . . " or "in response to determining."

Figure 1:
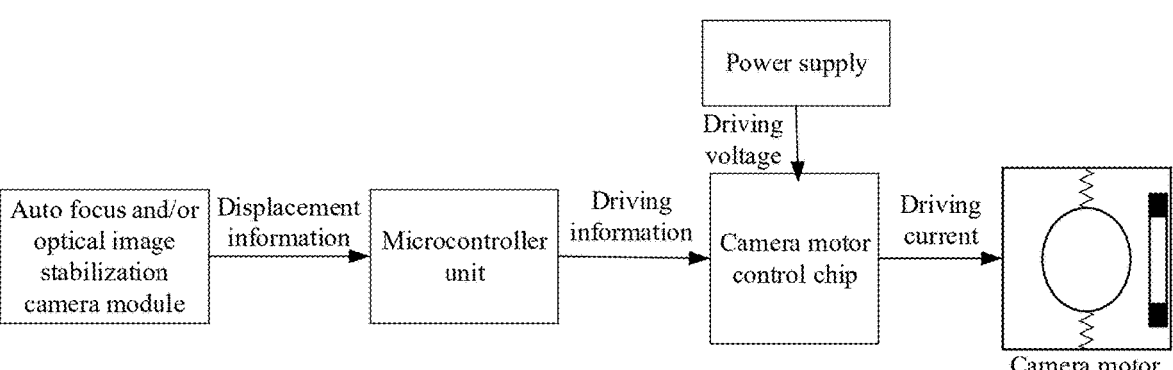
FIG. 1 is a schematic diagram of an example scenario provided in an embodiment of the present disclosure.

FIG. 1 is a schematic diagram of an example scenario provided in an embodiment of the present disclosure. As shown in FIG. 1, the example scenario is an automatic optical focus or optical image stabilization solution currently used by a portable electronic device such as a mobile phone and a tablet on the market. In this example scenario, in case of occurrence of camera displacement, the auto focus and/or optical image stabilization camera module will determine displacement information of focusing or dithering, and then input the displacement information into a microcontroller unit (MCU). The microcontroller unit outputs driving information to a camera motor control chip. The camera motor control chip uses a constant driving voltage provided by an external power supply as an operating voltage, generates a driving current based on the driving information, then drives the camera motor to operate based on the driving current and the driving voltage, and drives the camera motor in the operation state to drive a camera connected to it to generate a displacement, to achieve automatic optical focusing or optical image stabilization.

However, in the example scenario, when the camera motor drives the camera to generate the displacement, the driving current of the camera motor is linearly associated with the displacement amount, but in most cases, the focusing displacement or dithering is small. Therefore, the camera motor needs to drive the camera to generate a small displacement, requiring a small driving current and a small driving voltage, but the driving voltage inputted from the external power supply is a constant high voltage, and the driving voltage exceeds the voltage range required by the camera motor, thereby increasing the power consumption, and resulting in a low energy efficiency ratio.

In order to solve the problem of the low energy efficiency ratio in the example scenario, the current solution is to change the driving voltage in a coordinated manner by pulse width modulation (PWM) based on load of the camera motor, thereby driving the camera to generate a displacement with low power consumption, and improving the energy efficiency ratio. However, the pulse width modulation solution will introduce a large noise, and then reduce the driving accuracy.

Therefore, the present disclosure presents a driving apparatus, an image collection module, and a method for voltage regulation, to solve the above problems.

Embodiment I

Figure 2:
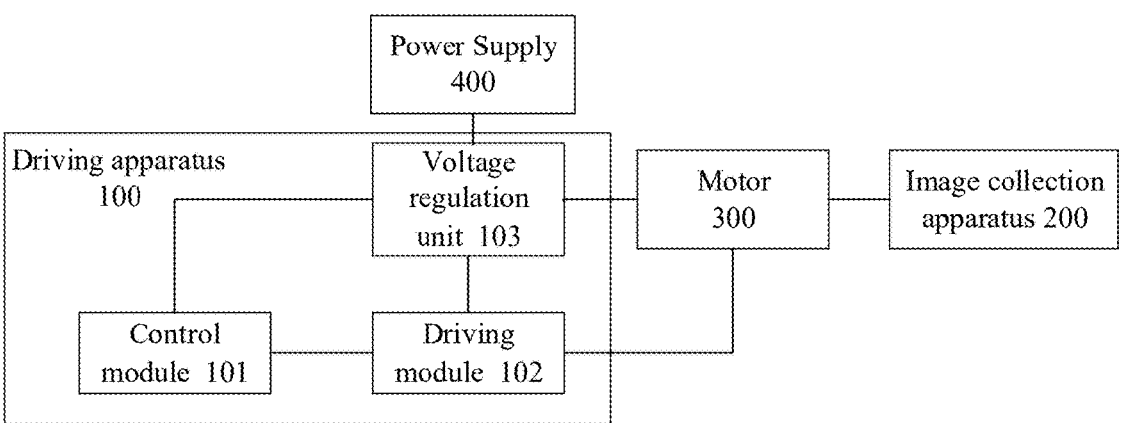
FIG. 2 is a schematic diagram of a driving apparatus provided in an embodiment of the present disclosure.

FIG. 2 is a schematic diagram of a driving apparatus provided in an embodiment of the present disclosure. As shown in FIG. 2, the driving apparatus 100 is configured to drive a motor 300 of an image collection apparatus 200, and includes: a control module 101, a driving module 102, and a voltage regulation unit 103. The control module 101 is configured to acquire displacement information of the image collection apparatus 200, transmit a driving current instruction to the driving module based on the displacement information, and transmit a voltage regulation signal to the voltage regulation unit 103 based on the displacement information. The driving module 102 is configured to generate a driving current based on the driving current instruction. The voltage regulation unit 103 is configured to regulate a voltage inputted from a power supply 400 to a driving voltage matching the driving current based on the voltage regulation signal, and transmit the driving voltage to the driving module 102, so that the driving module 102 drives the motor 300 through the driving current and the driving voltage.

In order to control the driving voltage, the control module 101 first acquires the displacement information of the image collection apparatus 200. The image collection apparatus 200 may be an apparatus such as a camera for collecting an image. The displacement information of the image collection apparatus 200 may be generated by a host based on a plurality of images collected by the image collection apparatus 200, or may be generated by the gyroscope sensor based on data when the image collection apparatus 200 generates a displacement. The control module 101 will generate the driving current instruction and the voltage regulation signal based on the acquired displacement information. In a possible implementation, the control module 101 may further generate the voltage regulation instruction based on the displacement information, and the voltage regulation instruction is used to generate the voltage regulation signal. The control module 101 transmits the driving current instruction to the driving module 102. A driving current indicated by the driving current instruction is a current required by the motor 300 to drive the image collection apparatus 200 to generate a displacement corresponding to the displacement information, and transmit the voltage regulation signal to the voltage regulation unit 103. The voltage regulation unit 103 may be a switching power supply or other high-efficiency power management chips, such as a DC-to-DC converter (DCDC) power management chip. The voltage regulation unit 103 will regulate the voltage inputted from the power supply 400 to the driving voltage matching the driving current based on the received voltage regulation signal, and then transmit the driving voltage to the driving module 102. Then, the driving module 102 will drive the motor 300 through the driving current and the driving voltage, and the motor 300 is driven to drive the image collection apparatus 200 to generate the corresponding displacement, to achieve auto focus and/or optical image stabilization.

In the embodiment of the present disclosure, the control module 101 generates the driving current instruction based on the displacement information of the image collection apparatus 200, and then generates the voltage regulation signal used to enable the voltage regulation unit 103 to regulate the voltage inputted from the power supply 400 to the driving voltage matching the driving current, so that the voltage regulation unit 103 controls the voltage inputted from the power supply 400 based on the actual power required by the driving module 102 to drive the motor 300, thereby reducing the power consumption, and improving the energy efficiency ratio.

Embodiment II

Based on Embodiment I, the control module 101 can be configured to determine the first driving current and the second driving current based on the displacement information, and generate the voltage regulation instruction based on a maximum value of the first driving current and the second driving current, wherein the first driving current is used to drive the motor 300 to drive the image collection apparatus 200 to move in a direction of an optical axis, and the second driving current is used to drive the motor 300 to drive the image collection apparatus 200 to move in a direction perpendicular to the optical axis.

Any displacement generated by the image collection apparatus 200 can be divided into a sum of a displacement generated by motion in the direction of the optical axis and a displacement generated by motion in the direction perpendicular to the optical axis. The motor 300 needs to drive the image collection apparatus 200 to move, to offset the displacement generated by the image collection apparatus 200. Therefore, it is first necessary to calculate the first driving current ix_driver required by the motor 300 to drive the image collection apparatus 200 to move in the direction of the optical axis and the second driving current iy_driver required by the motor 300 to drive the image collection apparatus 200 to move in the direction perpendicular to the optical axis respectively. Moreover, since the first driving current ix_driver and the second driving current iy_driver required to drive the image collection apparatus 200 may be different, the driving power required by the motor 300 needs to be subject to a maximum value of driving powers in the two directions, that is, the maximum value between the ix_driver and the iy_driver is selected to generate the voltage regulation instruction.

It should be noted that the displacement generated by the image collection apparatus 200 may be very small, so that very small ix_driver and iy_driver are calculated, and then very small required driving voltages are calculated. In this case, a normal operating voltage of the motor 300 needs to be referenced. When the required driving voltage is smaller than the normal operating voltage of the motor 300, the normal operating voltage of the motor 300 is used as the required driving voltage, and the control module 101 generates the voltage regulation instruction based on the normal operating voltage of the motor 300.

In the embodiment of the present disclosure, the control module 101 generates the voltage regulation instruction based on the first driving current and the second driving current, and ultimately can provide the driving voltage to the motor 300 more accurately, thereby further improving the energy efficiency ratio. Moreover, when a small driving voltage is required by the motor 300, the voltage regulation instruction can be generated based on the normal operating voltage of the motor 300, to ensure that the motor 300 operates normally.

Embodiment III

Based on Embodiment I, the control module 101 can be configured to determine a first focusing code and a second focusing code based on the displacement information, and generate the voltage regulation instruction based on the first focusing code and the second focusing code, wherein a first driving current corresponding to the first focusing code is used to drive the motor 300 to drive the image collection apparatus 200 to move in a direction of an optical axis, and a second driving current corresponding to the second focusing code is used to drive the motor 300 to drive the image collection apparatus 200 to move in a direction perpendicular to the optical axis.

The control module 101 not only can generate the voltage regulation instruction based on the driving current, but also can generate the voltage regulation instruction based on the focusing codes. Specifically, when generating the voltage regulation instruction, the control module 101 first needs to calculate the driving current ix_driver required by the motor 300 to drive the image collection apparatus 200 to move in the direction of the optical axis and the driving current iy_driver required by the motor 300 to drive the image collection apparatus 200 to move in the direction perpendicular to the optical axis respectively, then determines the first focusing code and the second focusing code corresponding to the ix_driver and the iy_driver, then determines an N-bit focusing code based on the first focusing code and the second focusing code, and generates the voltage regulation instruction based on the N-bit focusing code, wherein N is a positive integer.

In the embodiment of the present disclosure, the control module 101 generates the voltage regulation instruction based on the first focusing code and the second focusing code, and ultimately can provide the driving voltage to the motor 300 more accurately, thereby further improving the energy efficiency ratio.

Embodiment IV

Figure 3:
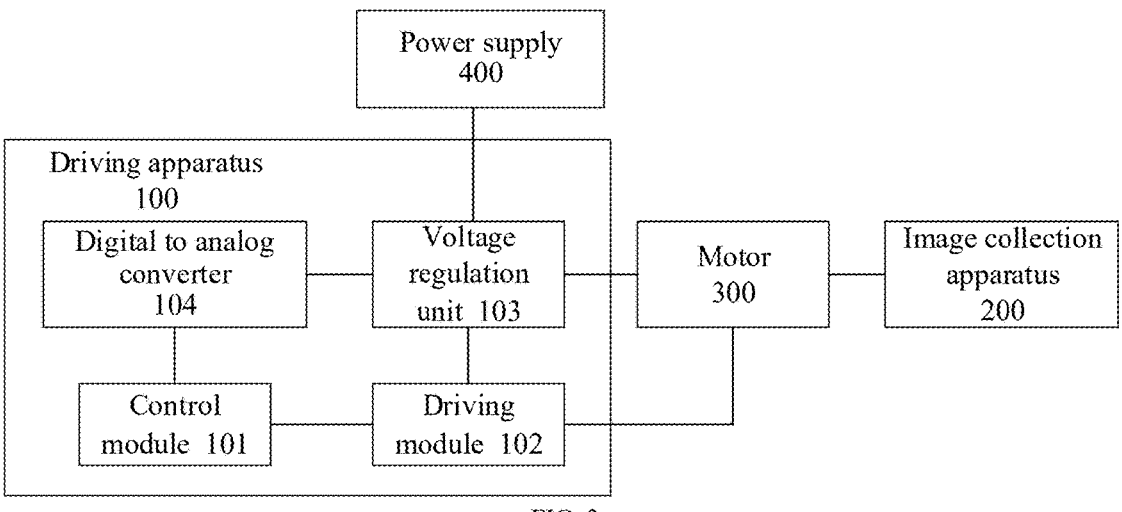
FIG. 3 is a schematic diagram of another driving apparatus provided in an embodiment of the present disclosure.

Based on any one embodiment among Embodiments I-III, as shown in FIG. 3, the driving apparatus 100 further includes a digital to analog converter 104.

The control module 101 is configured to transmit the voltage regulation instruction to the digital to analog converter 104. The digital to analog converter 104 is configured to generate the voltage regulation signal based on the voltage regulation instruction, and transmit the voltage regulation signal to the voltage regulation unit 103, so that the voltage regulation unit 103 regulates a voltage value of the voltage inputted from the power supply 400 to a voltage value indicated by the voltage regulation signal.

When performing auto focus or optical image stabilization, the control module 101 first acquires the displacement information of the image collection apparatus 200, then generates the driving current instruction based on the displacement information, and transmits it to the driving module 102. The driving current indicated by the driving current instruction is the current required by the motor 300 to drive the image collection apparatus 200 to generate the displacement corresponding to the displacement information. Moreover, the control module 101 transmits the voltage regulation instruction to the digital to analog converter 104 based on the displacement information, so that the digital to analog converter 104 generates the voltage regulation signal based on the voltage regulation instruction, and transmits it to the voltage regulation unit 103. For example, the voltage regulation signal may be an analog voltage, and the analog voltage matches the driving current indicated by the driving current instruction. The voltage regulation unit 103 regulates the voltage inputted from the power supply 400 to the driving voltage matching the driving current indicated by the driving current instruction based on the analog voltage, and transmits the driving voltage to the driving module 102. The driving module 102 generates the driving current based on the driving current instruction, and then drives the motor 300 through the driving current and the driving voltage, so that the motor 300 drives the image collection apparatus 200 to generate the displacement corresponding to the displacement information.

In the present disclosure, the digital to analog converter 104 is arranged in the driving apparatus 100, so that the voltage regulation unit 103 can regulate the voltage inputted from the power supply 400 without having a digital to analog conversion function, thus improving the voltage regulation efficiency of the voltage regulation unit 103.

Embodiment V

Based on any one embodiment among Embodiments I-III, the voltage regulation unit 103 may be configured to regulate a voltage value of the voltage inputted from the power supply 400 to a voltage value indicated by the voltage regulation signal based on the voltage regulation signal.

The voltage regulation unit 103 may be a high-efficiency power management chip with a digital communication function, for example, may be a DC-to-DC converter (DCDC) power management chip with a digital communication function, and therefore can directly regulate the voltage inputted from the power supply 400 based on the voltage regulation signal. Specifically, the voltage regulation unit 103 can regulate the voltage inputted from the power supply 400 to the driving voltage matching the driving current indicated by the driving current instruction based on an analog voltage.

In the embodiment of the present disclosure, since the voltage regulation unit 103 can directly regulate the voltage inputted from the power supply 400 based on the voltage regulation signal, thereby reducing the data processing pressure of the control module 101, and improving the processing efficiency of the control module 101.

Embodiment VI

Figure 4:
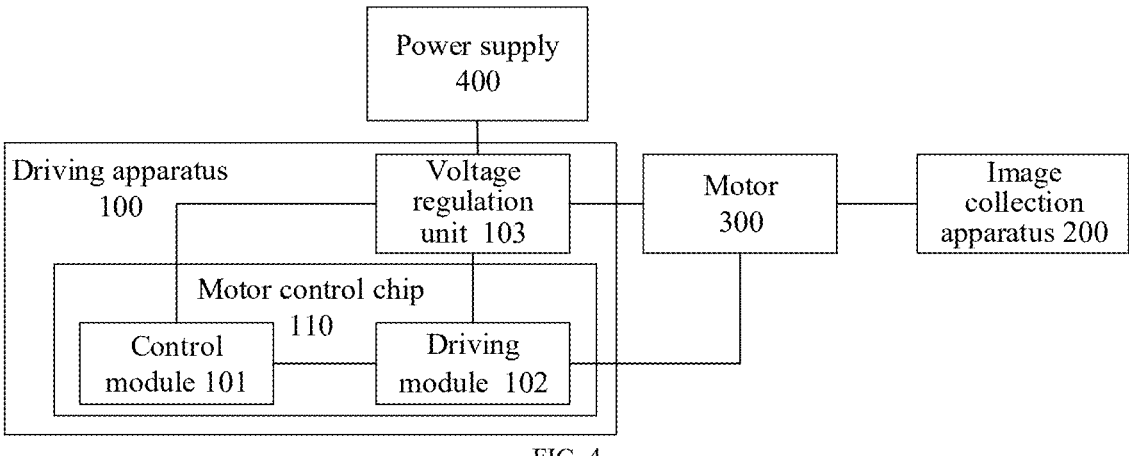
FIG. 4 is a schematic diagram of a driving apparatus including a motor control chip provided in an embodiment of the present disclosure.

Based on any one embodiment among Embodiments I-V, as shown in FIG. 4, the control module 101 and the driving module 102 in the driving apparatus 100 may be arranged in the motor control chip 110, to externally connect the voltage regulation unit 103 to the motor control chip. The control module 101 and the driving module 102 are arranged separately from the voltage regulation unit 103.

In the embodiment of the present disclosure, since the voltage regulation unit 103 is a unit for regulating the voltage inputted from the power supply 400, it generates heat significantly in an operating state, and will have a high temperature. The control module 101 and the driving module 102 are integrated with the voltage regulation unit 103, so that the motor control chip 110 will not be affected by the heat of the voltage regulation unit 103, thereby reducing the operating temperature of the motor control chip 110, and improving the working accuracy of the motor control chip 110. Further, when the image collection module is constructed, since the motor control chip 110 and the voltage regulation unit 103 are not integrated, the voltage regulation unit 103 may be selectively arranged inside the image collection module, or may be arranged outside the image collection module as needed. When the voltage regulation unit 103 is arranged outside the image collection module, the physical area occupied by the constructed image collection module can be reduced.

Figure 5:
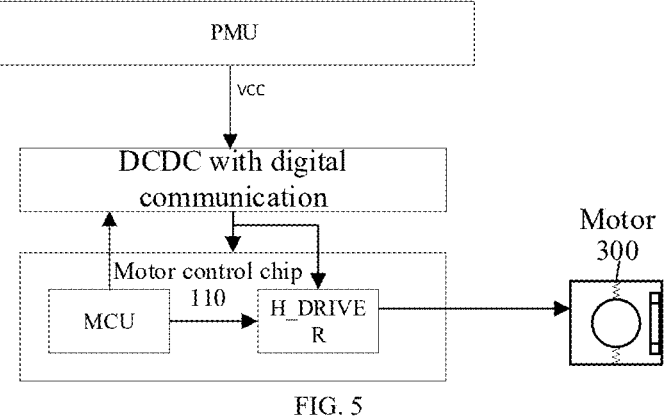
FIG. 5 is a schematic diagram of a driving apparatus applicable to embodiments of the present disclosure.

For example, as shown in FIG. 5, the control module 101 may be a microcontroller unit (MCU), the driving module 102 may be an H_DRIVER, the voltage regulation unit 103 may be a DCDC with a digital communication function, the MCU and the H_DRIVER are arranged in the motor control chip 110, and the MCU transmits the voltage regulation signal to the DCDC. In this case, the voltage regulation signal is a voltage regulation instruction. Then, the DCDC regulates the voltage VCC inputted from the power supply (PMU) to the driving voltage based on the voltage regulation instruction. Then, the H_DRIVER generates the driving current based on the driving current instruction transmitted from the MCU. The H_DRIVER drives the motor based on the driving current and the driving voltage.

Embodiment VII

Based on any one embodiment among Embodiments I-V, as shown in FIG. 6, the driving apparatus 100 may include a motor control chip 120, and the control module 101, the driving module 102, and the voltage regulation unit 103 are integrated into the motor control chip 120. The control module 101, the driving module 102, and the voltage regulation unit 103 are integrated.

In the embodiment of the present disclosure, when the control module 101, the driving module 102, and the voltage regulation unit 103 are integrated, since the voltage regulation unit 103, when arranged outside the motor control chip 120, will occupy off-chip communication resources, increase the encapsulation costs and peripheral circuit area, and then increase the application complexity. Therefore, the integrated arrangement releases the off-chip communication resources, reduces the encapsulation costs, reduces the peripheral circuit area, and then reduces the application complexity.

For example, as shown in FIG. 7, the control module 101 may be a microcontroller unit (MCU), the driving module 102 may be an H_DRIVER, and the voltage regulation unit 103 may be a DCDC without a digital communication function. The MCU, the H_DRIVER, and the DCDC are all arranged in the motor control chip 120. Because of having no digital communication function, the DCDC fails to recognize the voltage regulation instruction transmitted from the MCU, so that the digital to analog converter 104 (DAC) may also be arranged in the motor control chip 120. The DAC converts the voltage regulation instruction transmitted from the MCU into the analog voltage, determines the analog voltage as the voltage regulation signal, and transmits it to the DCDC. Then, the DCDC regulates the voltage VCC inputted from the power supply (PMU) to a driving voltage indicated by the analog voltage based on the analog voltage. Then, the H_DRIVER generates the driving current based on the driving current instruction transmitted from the MCU. The H_DRIVER drives the motor based on the driving current and the driving voltage.

Embodiment VIII

Based on any one embodiment among Embodiments I-VII, the power supply 400 can power the control module 101 through a power supply interface of the control module 101.

When the voltage regulation unit 103 transmits the driving voltage to the driving module 102 to power the driving module 102, the operating voltage of the control module 101 may be provided by the power supply 400, and is applicable to a dual power supply scenario. For example, when the control module 101 is an integrated optical image stabilization (OIS) control driver chip, the power supply 400 powers the integrated OIS control driver chip through a power supply interface of the integrated OIS control driver chip.

In the embodiment of the present disclosure, the control module 101 is powered by the power supply 400, which may be applicable to a dual power supply scenario.

Embodiment IX

Based on any one embodiment among Embodiments I-VII, the voltage regulation unit 103 can power the control module 101 through a power supply interface of the control module 101.

The operating voltage of the control module 101 may be provided by the voltage regulation unit 103, and is applicable to a single power supply scenario. For example, when the control module 101 is a discrete optical image stabilization (OIS) control driver chip or an open-loop/closed-loop auto focus (AF) camera motor control chip, it is powered through the power supply interface of the voltage regulation unit 103.

It should be noted that when the operating voltage of the control module 101 is provided by the voltage regulation unit 103, the driving current generated by the control module 101 includes a current driving the motor 300 and a current driving the control module 101 to operate. In this case, the voltage regulation unit 103 regulates the obtained driving voltage to include a voltage driving the motor 300 and a voltage driving the control module 101 to operate.

In the embodiment of the present disclosure, the control module 101 is powered by the voltage regulation unit 103, which may be applicable to a single power supply scenario.

Embodiment X

FIG. 8 is a schematic diagram of an image collection module provided in an embodiment of the present disclosure. As shown in FIG. 8, the image collection module 500 includes: a displacement information generation apparatus 501, as well as the driving apparatus 100, the motor 300, and the image collection apparatus 200 according to any one of the above embodiments. The displacement information generation apparatus 501 is configured to generate displacement information based on a displacement generated by the image collection apparatus 200, and transmit the displacement information to the driving apparatus 100. The motor 300 is driven by the driving apparatus 100 to drive the image collection apparatus 200 to generate the displacement.

The displacement information generation apparatus 501 may be a host or a gyroscope sensor. When the displacement information generation apparatus 501 is a host, the displacement information generation apparatus 501 generates the displacement information of the image collection apparatus 200 based on a plurality of images collected by the image collection apparatus 200. The specific displacement information may be obtained by comparing offset values of feature points in the plurality of images. When the displacement information generation apparatus 501 is a gyroscope sensor, the displacement information generation apparatus 501 generates the displacement information of the image collection apparatus based on motion data of the image collection apparatus, wherein the motion information of the image collection apparatus may include an angular velocity of the image collection apparatus and an acceleration of the image collection apparatus. The gyroscope sensor is a motion sensor. A common gyroscope sensor includes a three-axis gyroscope sensor and a six-axis gyroscope sensor. The three-axis gyroscope sensor can detect angular velocities in three directions, and the six-axis gyroscope sensor is additionally provided with acceleration metering apparatuses in three directions based on the three-axis gyroscope sensor, which can detect accelerations in three directions. In order to reduce costs, the three-axis gyroscope sensor may be selected. In order to improve the accuracy of displacement information collection of the image collection apparatus 200, the six-axis gyroscope sensor may be selected, which can comprehensively reflect the motion state and posture of the image collection apparatus 200.

In the embodiment of the present disclosure, the driving apparatus 100 generates the driving current based on the displacement information generated by the displacement information generation apparatus 501, and then controls the voltage inputted from the power supply 400 based on the actual power required to drive the motor 300, thereby reducing the power consumption, and improving the energy efficiency ratio.

Embodiment XI

Figure 9:
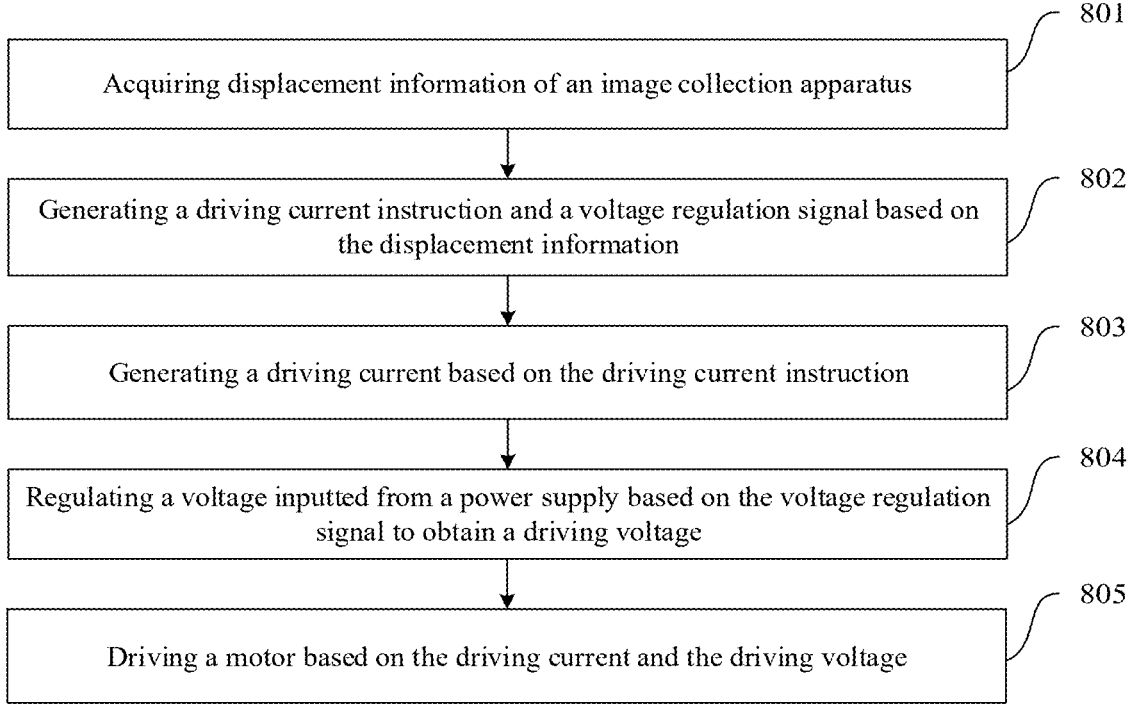
FIG. 9 is a flowchart of steps of a method for voltage regulation provided in an embodiment of the present disclosure.

FIG. 9 is a flowchart of steps of a method for voltage regulation provided in an embodiment of the present disclosure. As shown in FIG. 9, the method for voltage regulation includes the following steps:

Step 801: acquiring displacement information of an image collection apparatus.

In order to control the driving voltage, the displacement information of the image collection apparatus is first acquired. The image collection apparatus may be an apparatus such as a camera for collecting an image. The displacement information of the image collection apparatus may be generated by a host based on a plurality of images collected by the image collection apparatus, or may be generated by a gyroscope sensor based on data when the image collection apparatus generates a displacement.

Step 802: generating a driving current instruction and a voltage regulation signal based on the displacement information.

Specifically, the process of the generating the voltage regulation signal based on the voltage regulation instruction may further include:

generating the voltage regulating instruction based on the displacement information, and generating the voltage regulation signal based on the voltage regulating instruction.

Step 803: generating a driving current based on the driving current instruction.

Step 804: regulating a voltage inputted from a power supply based on the voltage regulation signal to obtain a driving voltage.

Step 805: driving a motor based on the driving current and the driving voltage.

The required driving current and the voltage regulation signal are generated based on the acquired displacement information, the voltage inputted from the power supply is regulated to a driving voltage matching the driving current, and the motor is driven through the driving current and the driving voltage. After being driven, the motor will drive the image collection apparatus to generate a corresponding displacement to achieve auto focus and/or optical image stabilization.

In the embodiment of the present disclosure, the driving current instruction is generated based on the displacement information of the image collection apparatus, and then the driving current and the voltage regulation signal for regulating the voltage inputted from the power supply to the driving voltage matching the driving current are generated, so that the voltage inputted from the power supply can be controlled based on the actual power required to drive the motor, thereby reducing the power consumption, and improving the energy efficiency ratio.

Embodiment XII

Based on Embodiment XI, the process of the generating the voltage regulation signal based on the voltage regulation instruction may further include:

performing digital to analog conversion on the voltage regulation instruction to obtain the voltage regulation signal.

In the embodiment of the present disclosure, digital to analog conversion is performed on the voltage regulation instruction, so that an analog voltage can be used as the voltage regulation signal for regulation during voltage regulation, thereby improving the voltage regulation efficiency.

Embodiment XIII

Based on Embodiment XI, the process of the generating the voltage regulation signal based on the voltage regulation instruction may further include:

determining the voltage regulation instruction as the voltage regulation signal.

In the embodiment of the present disclosure, the voltage regulation instruction is directly determined as the voltage regulation signal, thereby improving the efficiency of generating the voltage regulation signal.

Embodiment XIV

Based on Embodiment XI, the process of the generating the voltage regulation signal based on the displacement information may further include:

determining a first driving current and a second driving current based on the displacement information, and generating the voltage regulation instruction based on a maximum value of the first driving current and the second driving current.

Any displacement generated by the image collection apparatus can be divided into a sum of a displacement generated by motion in a direction of an optical axis and a displacement generated by motion in a direction perpendicular to the optical axis. The motor needs to drive the image collection apparatus to move, to offset the displacement generated by the image collection apparatus. Therefore, it is first necessary to calculate the first driving current ix_driver required by the motor to drive the image collection apparatus to move in the direction of the optical axis and the second driving current iy_driver required by the motor to drive the image collection apparatus to move in the direction perpendicular to the optical axis respectively. Moreover, since the first driving current ix_driver and the second driving current iy_driver required to drive the image collection apparatus may be different, the driving power required by the motor needs to be subject to a maximum value of driving powers in the two directions, that is, the maximum value between the ix_driver and the iy_driver is selected as the driving current to generate the voltage regulation instruction. Then, the required driving voltage is calculated based on the driving current and a resistance value of the motor, and the voltage regulation instruction is generated based on the required driving voltage.

It should be noted that the displacement generated by the image collection apparatus may be very small, so that very small ix_driver and iy_driver are calculated, and then very small required driving voltages are calculated. In this case, a normal operating voltage of the motor needs to be referenced. When the required driving voltage is smaller than the normal operating voltage of the motor, the normal operating voltage of the motor is used as the required driving voltage, and the voltage regulation instruction is generated based on the normal operating voltage of the motor.

In the embodiment of the present disclosure, the voltage regulation instruction is generated based on the first driving current and the second driving current, and ultimately the driving voltage can be provided to the motor more accurately, thereby further improving the energy efficiency ratio. Moreover, when a small driving voltage is required by the motor, the voltage regulation instruction can be generated based on the normal operating voltage of the motor, to ensure that the motor operates normally.

Embodiment XV

Based on Embodiment XI, the process of the generating the voltage regulation signal based on the displacement information may further include:

determining a first focusing code and a second focusing code based on the displacement information, and generating the voltage regulation instruction based on the first focusing code and the second focusing code.

Not only can the voltage regulation instruction be generated based on the driving current, but also the voltage regulation instruction can be generated based on the focusing codes. Specifically, when the voltage regulation instruction is generated, it is first necessary to calculate the driving current ix_driver required by the motor to drive the image collection apparatus to move in the direction of the optical axis and the driving current iy_driver required by the motor to drive the image collection apparatus to move in the direction perpendicular to the optical axis respectively, then determine the first focusing code and the second focusing code corresponding to the ix_driver and the iy_driver, then determine an N-bit focusing code based on the first focusing code and the second focusing code, and generate the voltage regulation instruction based on the N-bit focusing code, wherein N is a positive integer.

In the embodiment of the present disclosure, the voltage regulation instruction is generated based on the first focusing code and the second focusing code, and ultimately the driving voltage can be provided to the motor more accurately, thereby further improving the energy efficiency ratio.

It should be noted that the embodiments in the present disclosure and/or the technical features in the embodiments may be combined with each other in any way in the case of no conflict, and the combined technical solutions should also be encompassed within the scope of protection of the present disclosure.

It should be understood that the specific examples in the embodiments of the present disclosure are provided only to help those skilled in the art to better understand the embodiments of the present disclosure, rather than limiting the scope of the embodiments of the present disclosure. Those skilled in the art may make various improvements and modifications on the basis of the above embodiments, and these improvements or modifications are all encompassed within the scope of protection of the present disclosure.

While the above description merely provides specific embodiments of the present disclosure, the scope of protection of the present disclosure is not limited to the specific embodiments. Any person skilled in the art can easily conceive of alterations or replacements within the technical scope disclosed in the present disclosure. All these alterations or replacements should be encompassed within the scope of protection of the present disclosure. Therefore, the scope of protection of the present disclosure should be determined by the scope of protection of the claims.

The invention claimed is:

1. A driving apparatus for driving a motor of an image collection apparatus, comprising: a control module, a driving module, and a voltage regulation unit, the control module and the driving module being arranged in a same chip, the voltage regulation unit supplying power the control module through a power supply interface of the control module;

the control module is configured to acquire displacement information of the image collection apparatus, transmit a driving current instruction to the driving module based on the displacement information, and transmit a voltage regulation signal to the voltage regulation unit based on the displacement information;

the driving module is configured to generate a driving current based on the driving current instruction;

the voltage regulation unit is configured to regulate a voltage inputted from a power supply to a driving voltage matching the driving current based on the voltage regulation signal, and transmit the driving voltage to the driving module to power the driving module, so that the driving module drives the motor through the driving current and the driving voltage, wherein the displacement information at least includes X-axis displacement information and Y-axis displacement information, and the control module is configured to generate a voltage regulation instruction based on the X-axis displacement information and the Y-axis displacement information, wherein the voltage regulation instruction is used to generate the voltage regulation signal; and the control module is further configured to determine a first focusing code and a second focusing code based on the X-axis displacement information and the Y-axis displacement information, and generate the voltage regulation instruction based on the first focusing code and the second focusing code, wherein a first driving current corresponding to the first focusing code is used to drive the motor to drive the image collection apparatus to move in a direction of an optical axis, and a second driving current corresponding to the second focusing code is used to drive the motor to drive the image collection apparatus to move in a direction perpendicular to the optical axis.

2. The apparatus according to claim 1, wherein the driving apparatus further comprises a digital to analog converter;

the control module is configured to transmit the voltage regulation instruction to the digital to analog converter; and the digital to analog converter is configured to generate the voltage regulation signal based on the voltage regulation instruction, and transmit the voltage regulation signal to the voltage regulation unit, so that the voltage regulation unit regulates a voltage value of the voltage inputted from the power supply to a voltage value indicated by the voltage regulation signal.

3. The apparatus according to claim 1, wherein the voltage regulation unit is configured to regulate a voltage value of the voltage inputted from the power supply to a voltage value indicated by the voltage regulation signal based on the voltage regulation signal.

4. An image collection module, comprising: a displacement information generation apparatus, a driving apparatus, a motor, and an image collection apparatus; wherein the displacement information generation apparatus is configured to generate displacement information based on a displacement generated by the image collection apparatus, and transmit the displacement information to the driving apparatus; and the motor is driven by the driving apparatus to drive the image collection apparatus to generate the displacement;

wherein the driving apparatus comprising: a control module, a driving module, and a voltage regulation unit, the control module and the driving module being arranged in a same chip, the voltage regulation unit supplying power the control module through a power supply interface of the control module;

the control module is configured to acquire displacement information of the image collection apparatus, transmit a driving current instruction to the driving module based on the displacement information, and transmit a voltage regulation signal to the voltage regulation unit based on the displacement information;

the driving module is configured to generate a driving current based on the driving current instruction;

the voltage regulation unit is configured to regulate a voltage inputted from a power supply to a driving voltage matching the driving current based on the voltage regulation signal, and transmit the driving voltage to the driving module to power the driving module, so that the driving module drives the motor through the driving current and the driving voltage, wherein the displacement information at least includes X-axis displacement information and Y-axis displacement information, and the control module is configured to generate a voltage regulation instruction based on the X-axis displacement information and the Y-axis displacement information, wherein the voltage regulation instruction is used to generate the voltage regulation signal; and the control module is further configured to determine a first focusing code and a second focusing code based on the X-axis displacement information and the Y-axis displacement information, and generate the voltage regulation instruction based on the first focusing code and the second focusing code, wherein a first driving current corresponding to the first focusing code is used to drive the motor to drive the image collection apparatus to move in a direction of an optical axis, and a second driving current corresponding to the second focusing code is used to drive the motor to drive the image collection apparatus to move in a direction perpendicular to the optical axis.

5. The image collection module according to claim 4, wherein the displacement information generation apparatus comprises a host or a gyroscope sensor;

the host is configured to generate the displacement information of the image collection apparatus based on a plurality of images collected by the image collection apparatus; and the gyroscope sensor is configured to convert motion information of the image collection apparatus into an angular amount, and generate the displacement information of the image collection apparatus based on the angular amount, wherein the motion information of the image collection apparatus at least includes an angular velocity of the image collection apparatus and an acceleration of the image collection apparatus.

6. The image collection module according to claim 4, wherein the driving apparatus further comprises a digital to analog converter;

the control module is configured to transmit the voltage regulation instruction to the digital to analog converter; and the digital to analog converter is configured to generate the voltage regulation signal based on the voltage regulation instruction, and transmit the voltage regulation signal to the voltage regulation unit, so that the voltage regulation unit regulates a voltage value of the voltage inputted from the power supply to a voltage value indicated by the voltage regulation signal.

7. The image collection module according to claim 4, wherein the voltage regulation unit is configured to regulate a voltage value of the voltage inputted from the power supply to a voltage value indicated by the voltage regulation signal based on the voltage regulation signal.

8. A method for voltage regulation, applied to the driving apparatus according to claim 1, comprising:

acquiring displacement information of an image collection apparatus;

generating a driving current instruction based on the displacement information, wherein the displacement information at least includes X-axis displacement information and Y-axis displacement information;

generating a voltage regulation instruction based on the X-axis displacement information and the Y-axis displacement information;

generating a voltage regulation signal based on the voltage regulation instruction;

generating a driving current based on the driving current instruction;

regulating a voltage inputted from a power supply based on the voltage regulation signal to obtain a driving voltage;

driving a motor based on the driving current and the driving voltage, wherein the driving voltage matches the driving current, and the motor is configured to drive the image collection apparatus;

determining a first focusing code and a second focusing code based on the X-axis displacement information and the Y-axis displacement information; and generating the voltage regulation instruction based on the first focusing code and the second focusing code, wherein a first driving current corresponding to the first focusing code is used to drive the motor to drive the image collection apparatus to move in a direction of an optical axis, and a second driving current corresponding to the second focusing code is used to drive the motor to drive the image collection apparatus to move in a direction perpendicular to the optical axis.

9. The method according to claim 8, wherein the generating the voltage regulation signal based on the voltage regulation instruction comprises: performing digital to analog conversion on the voltage regulation instruction to obtain the voltage regulation signal.

10. The method according to claim 8, wherein the generating the voltage regulation signal based on the voltage regulation instruction comprises: determining the voltage regulation instruction as the voltage regulation signal.

* * * * *